United States Patent [19]

Zante et al.

[11] 4,250,705
[45] Feb. 17, 1981

[54] APPARATUS FOR THE CONNECTION BETWEEN TWO STAGES OF A SELF-PROPELLED ENGINE

[75] Inventors: Hubert A. Zante, Teheran, Iran; Pierre B. Pascal, Lesigny, France; Michel E. Schilling, Epinay sur Sein, France; Jackie G. Lamic, Saint Medard en Jalles, France

[73] Assignees: Societe Nationale des Poudres et Explosifs; Societe Luchaire, both of Paris, France

[21] Appl. No.: 865,026

[22] Filed: Dec. 28, 1977

[30] Foreign Application Priority Data

Dec. 28, 1976 [FR] France .................. 76 39278

[51] Int. Cl.³ .............................................. F02K 9/04
[52] U.S. Cl. ...................................... 60/225; 60/250; 102/49.4; 102/34.5
[58] Field of Search ............... 60/225, 245, 250, 256; 102/34.5, 49.4

[56] References Cited

U.S. PATENT DOCUMENTS

| 2,145,507 | 1/1939 | Denoix | 102/34.5 |
| 2,421,522 | 6/1947 | Pope | 60/250 |
| 2,458,475 | 1/1949 | Lauritsen et al. | 102/49.4 |
| 2,724,237 | 11/1955 | Hickman | 60/250 |
| 3,136,872 | 6/1964 | Banaszak | 60/256 |

Primary Examiner—Robert E. Garrett
Attorney, Agent, or Firm—Bucknam and Archer

[57] ABSTRACT

A device for joining the two stages 2 and 3 of a self-propelled engine comprises means for achieving the separation of the two stages 2 and 3 after the combustion of the pyrotechnic charge 12 of the rear stage 2 is completed, means for carrying out the ignition of the pyrotechnic charge 19 of the front stage 3.

A rear part of the front stage 3 and a front part of the rear stage 2 are assembled together for sliding axial movement therebetween. A temporary connection breakable under the effect of the ignition of the rear stage 2 maintains a predetermined spacing e between the two stages. The front stage 3 includes means 22 and 23 for igniting, after a predetermined delay, a pyrotechnic charge 19 of the front stage 3 and the rear stage 2 includes means 29 for triggering the igniting means after said temporary connection is eliminated.

5 Claims, 4 Drawing Figures

APPARATUS FOR THE CONNECTION BETWEEN TWO STAGES OF A SELF-PROPELLED ENGINE

The present invention relates to a device for joining two stages of a self-propelled engine, for example a rocket or flare, which permits on one hand to separate these two stages after the end of the combustion of the pyrotechnic charge of the rear stage and on the other hand to ignite the pyrotechnic charge of the front stage.

Numerous devices are known which make it possible to ignite the charge of the front stage of a self-propelled engine during the trajectory of the latter. These devices consist of a pyrotechnic delay which is fired after the combustion of the propellant charge of the rear stage has started. The pyrotechnic delay devices can be fired either by using combustion gases from the propellant charge of the rear stage, the pressure and temperature of these gases being suitable for actuating an auxiliary piston, as described in French Pat. No. 1,291,041, and/or for initiating a pyrotechnic charge, as described in French Pat. No. 1,513,277, or by using an inertia responsive mechanism, such as that described in French Pat. No. 2,068,342.

Devices are also known which make it possible to separate two stages of a self-propelled engine when the combustion of the pyrotechnic charge of the rear stage has ended. Amongst these known devices, there may be mentioned, for example, devices which use a special pyrotechnic charge which causes either the breaking of a temporary connection between the two stages, as described in French Pat. No. 1,435,514, or the breaking of such a frangible connection and actual separation of the two stages, as disclosed in French Pat. No. 2,260,078.

In other constructions stage separation is achieved by using the combustion gases of the pyrotechnic charge of the rear stage, suitable means being located either on the inside of the rear stage, as described in French Pat. No. 1,328,459, or on the outside of the latter, as described in French Pat. No. 1,549,618. Known self-propelled engines are equipped with separate means, one for igniting the charge of the front stage, and causing separation of the two stages. Due to the fact that different devices are used, engine constructions tend to be very complex and difficult to perfect, and the weight of the engines tends to reduce the length of their trajectory.

The present invention aims at elimination, or substantially reducing the drawbacks of the know engine constructions by providing a device for joining the two stages of a self-propelled engine which is particularly simple and yet it is very effective.

The device according to this invention comprises many for achieving the separation of the two stages after the end of the combustion of the pyrotechnic charge of the rear stage and means for igniting the pyrotechnic charge of the front stage.

Accordingly the invention provides a device wherein a rear part of the front stage and a front part of the rear stage are assembled together for sliding axial movement therebetween, a temporary fragile connection under the effect of the ignition of the rear stage maintains a predetermined spacing between said rear part of the front stage and said front part of the rear stage, the rear part of the front stage includes means for igniting, after a predetermined delay, a pyrotechnic charge of the front stage, the front part of the rear stage includes means for triggering said igniting means by contact therewith upon said spacing becoming closed when said temporary connection is eliminated.

In view of the fact that the temporary connection between the two stages is breakable as a result of the ignition of the rear stage, the accelerating thrust exerted by the rear stage causes movement of the two stages relative to each other to close the predetermined spacing. This relative movement causes first the delayed ignition of the pyrotechnic charge of the front stage, and then the separation of the two stages, after the combustion of the charge contained in the rear stage has ended.

An engine according to the invention may be particularly simple to produce and, moreover, be very efficient and reliable.

According to a preferred embodiment of the invention, the joining between the front stage and the rear stage comprises two cylindrical surfaces engaged one over the other and means for holding the front and rear stages against relative rotation.

In this manner, after destruction of the fragile axial connection between the two stages, if the rear stage is provided with small blades for producing rotation, the front stage will also be driven in rotation until the front stage has separated from the rear stage. This arrangement is very favourable for stabilising the trajectory of the engine. The fragile temporary connection under the effect of ignition of the rear stage may be achieved for instance by means of an open ring with shearable notches or by means of one or more pins which are shearable under the effect of the above mentioned ignition. Other details and advantages of the invention will become apparent from the following description.

The invention is illustrated by the non-limitative drawings, in which.

Figure 1:
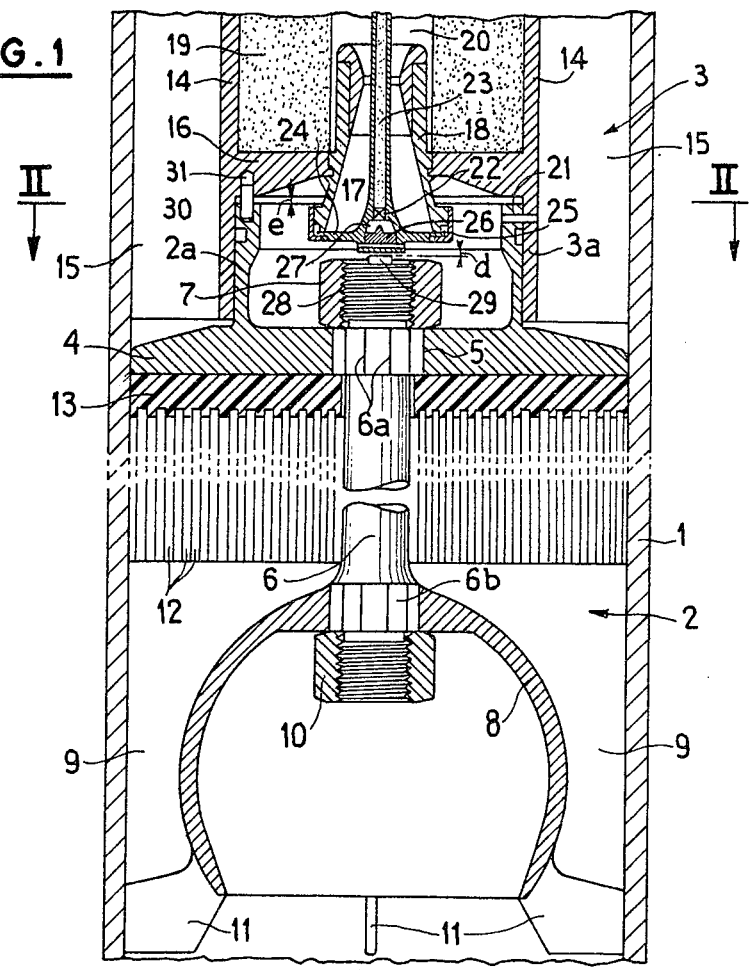
FIG. 1 is a partial longitudinal cross-section through a self-propelled engine embodying the device for joining the two stages, according to the invention, inserted in a launching tube.

In FIG. 1, the self-propelled engine inserted in the launching tube 1 comprises a rear stage 2 or accelerating stage and a front stage 3 or crusing stage. The front part of the rear stage 2 comprises a metal end-plate 4 having an axial bore 5 in which an axial rod 6 is secured. The rod 6 is fixed to the end-plate 4, on the one hand, by means of the grooved part 6a of the rod 6, which is forced into the bore 5, and on the other hand, by means of a nut 7 which is screwed onto a threaded front end of the rod 6. The rear end of rod 6 carries a bulb 8 which forms an annular nozzle 9 in combination with the internal surface of the launching tube 1. This bulb 8 is force-fitted onto a grooved part 6b of the rod 6, and is additionally secured by a nut 10. The bulb 8 carries on the other hand small blades 11. A pyrotechnic charge of the rear stage 2 comprises a large number of tubular strands of propellant 12 which are parallel to the axis of the engine and have their front ends embedded in a plastics base-plate 13 which is glued to the end-plate 4.

The propellant strands 12 can be produced, for example, by extrusion without a solvent of a double base propellant possessing a theoretical combustion rate of 35 mm/second under a pressure of 250 bars. The thickness of the propellant strands 12 can be adjusted to have a total combustion time of the charge of between 5 and 10 milliseconds.

The front cruising stage 3 comprises a cylindrical external wall 14 carrying small external stabilising blades 15. The rear part of this front stage 3 comprises a base 16 with an axial bore 17 in which a nozzle 18 is fixed. The base 16 of the front stage 3 carries a pyrotechnic charge 19 which consists of a propellant block possessing an axial channel 20. This axial channel 20 can have a transverse cross-section in the shape of a star or an analogous shape, so that the propellant block 19 possesses a combustion surface which is essentially constant as this combustion progresses.

The rear part 3a of the front stage 3 and the front part 2a of the rear stage 2 are assembled together so that they can slide relative to each other along the axis of the engine. In the example of FIG. 1, this sliding movement is achieved by means of two cylindrical sleeves 3a and 2a, inserted one in the other, which are respectively firmly fixed to the wall 14 of the front stage 3 and to the end-plate 4 of the rear stage 2.

One or more shear pins 21 distributed around the sleeve 3a are inserted radially in the sleeves 3a and 2a, to hold the sleeves against relative movement and to maintain a certain spacing e between the front part 2a of the rear stage 2 and the rear part 3a of the front stage 3. The pins 21 can be sheared by the action of the thrust applied when the pyrotechnic charge 12 of the rear stage 2 is ignited, as will be explained in greater detail below.

The rear part 3a of the front stage 3 includes means for igniting, after a predetermined delay, the pyrotechnic charge 19 of the front stage 3. In the example of FIG. 1, igniting means comprise a detonator 22 joined to a pyrotechnic transmission fuse 23 which contains powder having relatively rapid combustion. The pyrotechnic fuse 23 and the detonator 22 are fixed along the axis of the nozzle 18 by means of a flange 24 which is held on the lower end of the nozzle 18 by means of a ring 25.

The front part of the rear stage 2 comprises means for triggering the detonator 22 by contact with the latter. These means in the example of FIG. 1 consists of a striking pin 26 which is fixed in a housing 27 situated in the flange 24 opposite the detonator 22. The striking pin 26 is fixed to the housing 27 by means of a pin 28 of small diameter. The front end of the axial rod 6 of the rear stage 2 carries a tappet 29 which is situated opposite to, and a short distance from, the striking pin 26, this distance being very much less than the spacing e between the front part 2a of the rear stage 2 and the rear part of the front stage 3, so that the tappet 29 can cause the striking pin 26 to strike the detonator 22 when the spacing e is closed.

Figure 2:
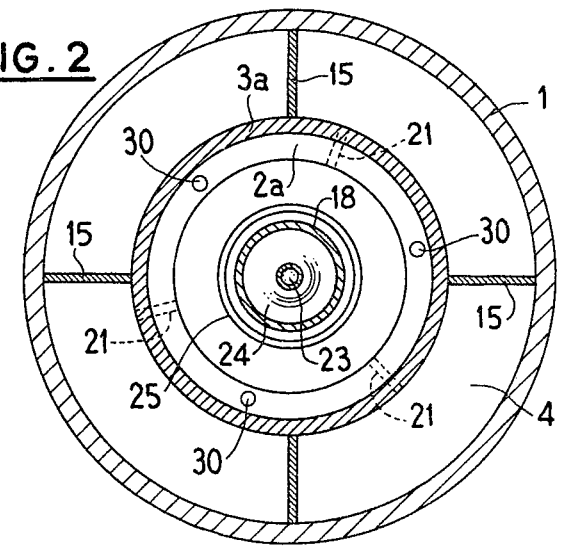
FIG. 2 is a cross-section taken along the line II—II in FIG. 1.

In the embodiments of FIGS. 1 and 2, the two stages 2 and 3 are held against relative rotation by three pins 30 which are firmly fixed to the front part 2a of the rear stage 2 and are inserted in bores 31 in the base 16 of the front stage 3. The pins 30 are distributed uniformly around the sleeve 2a.

Figure 3:
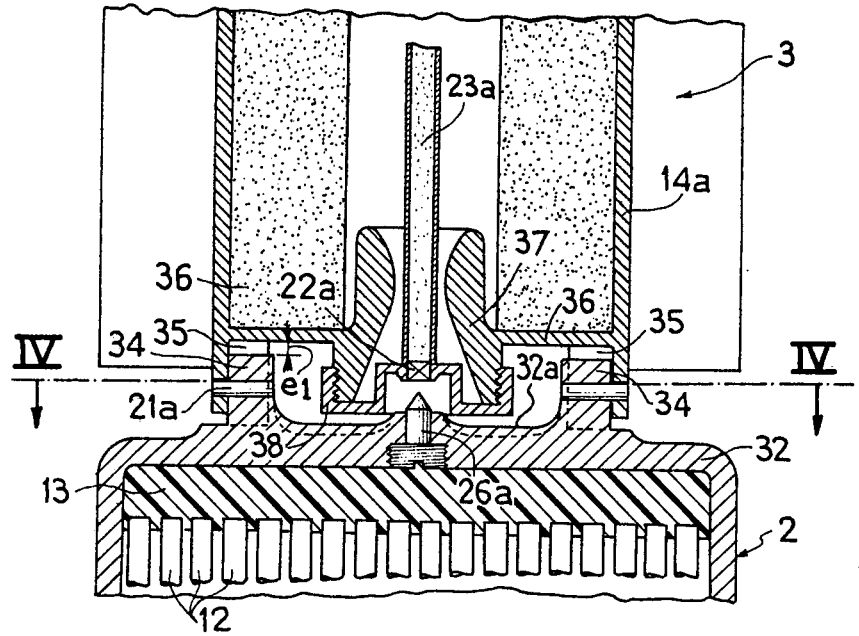
FIG. 3 is a partial longitudinal cross-section showing a variation of the connection device in accordance with the invention.
Figure 4:
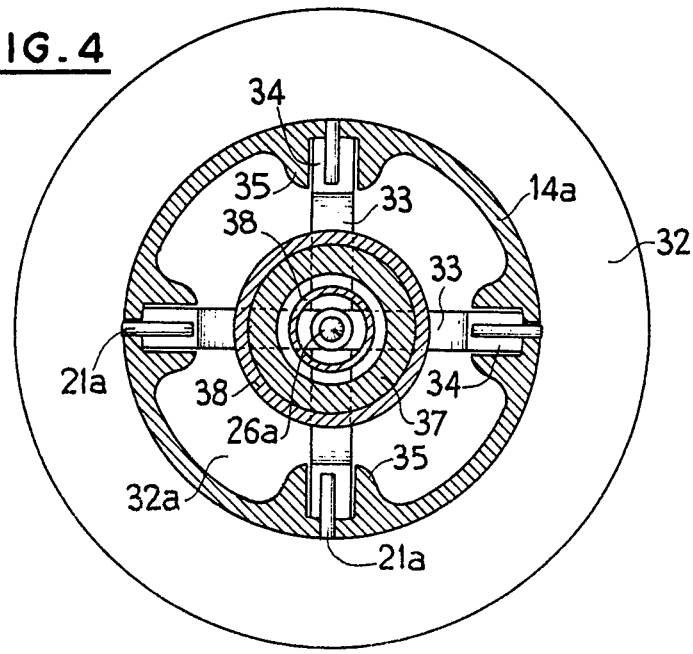
FIG. 4 is a cross-section taken along the line IV—IV in FIG. 3.

The embodiment shown in FIGS. 3 and 4 differs from that of FIGS. 1 and 2 in that instead of forming part of the front stage 3, the striking pin 26a is screwed into a wall 32 which forms the front of the rear stage 2, and it projects over the external surface 32a of this wall 32 opposite the detonator 22a. This arrangement is as effective as that in FIG. 1 but, on the other hand, it is a little less safe than the latter, especially when the front stage 3 is being positioned on the rear stage 2.

The front wall 32 of the rear stage 2 possesses two diametric ribs 33 arranged in the shape of a cross (see FIG. 4). The outer ends of the ribs 33 consist of fingers 34 which are inserted in forks 35 situated on the rear wall of the front stage 3 under the base 36 of the latter. The forks 35 form stops on either side of the fingers 34 and serve to hold the rear stage 2 against rotation relative to the front stage 3.

A temporary join between the stages, which can be broken by the action of the ignition of the pyrotechnic charge 12 of the rear stage 2, is formed in the embodiment of FIGS. 3 and 4 by means of shear pins 21a which pass radially through the side wall 14a of the front stage 3 and through the fingers 34 of the front wall 32 of the rear stage 2.

The pins 21a normally maintain a certain spacing $e_1$ between the base 36 of the front stage 3 and the upper end of the fingers 34 of the rear stage 2.

The pyrotechnic fuse 23a and the detonator 22a which is situated opposite the striking pin 26a, are fixed along the axis of the nozzle 37 by means of a collar 38 screwed around the lower edge of this nozzle 37.

In the embodiment of FIGS. 1 and 2, when the charge 12 of the rear stage 2 is ignited, the accelerating thrust created propels the latter forwards. The effect of this accelerating thrust is to shear the pins 21 and, consequently, to move the front part 2a of the rear stage 2 towards the wall 16 of the front stage 3. This movement, of amplitude e, causes the tappet 29 to move towards the striking pin 26. During the displacement, the tappet 29 shears the pin 28, with the result that the striking pin 26 strikes the detonator 22 and thus triggers the pyrotechnic transmission fuse 23.

All the abovementioned actions take place within a very short period of time, almost simultaneously with the ignition of the charge 12 of the rear stage 2.

After ignition, the rear stage 2 is held against the front stage 3 by means of the acceleration of the thrust exerted by the combustion of the pyrotechnic charge 12.

The pins 30, inserted in the corresponding bores 31, hold the stages 2 and 3 against relative rotation, so that the whole of the engine can be caused to rotate.

The combustion time of the pyrotechnic transmission fuse 23 can be adjusted by its length and by the combustion rate of the powder which it contains. In particular, the combustion time of the pyrotechnic fuse 23 can be adjusted to the combustion time of the charge 12 of the rear stage 2 so that ignition of the charge 19 of the front stage 3 coincides with the end of the combustion of the charge 12 of the rear stage 2, and to the point at which the engine leaves the launching tube. When the charge 19 of the front stage is ignited, the acceleration produced separates the front stage 3 from the rear stage 2 which is no longer propelled. The thrust of the combustion gases which is created when the charge 19 is ignited also has the effect of ejecting the collar 24 fixed to the base of the nozzle 18. The two stages 2 and 3 are separated automatically when the combustion of the charge 12 of the rear stage 2 has ended, and before the charge 19 of the front stage 3 is ignited, when the front stage 3 possesses a smaller maximum cross-section than that of the rear stage 2, as in the case of the embodiments shown.

The embodiment of FIGS. 3 and 4 operates in essentially the same manner as that of FIGS. 1 and 2.

With the described embodiments of the invention it is possible to separate the two stages after the combustion of the charge of the rear stage has ended and to ignite the pyrotechnic charge of the front stage.

Of course, modifications are possible. For example the pins 21 and 21a could be replaced by any other frangible means which makes it possible to produce a temporary and breakable connection between the stages 2 and 3, such as, stops which can be sheared or flexible stops placed between the adjacent ends of the two stages 2 and 3.

Moreover, the two stages 2 and 3 could be secured against relative rotation by joining the adjacent ends 2a and 3a of the two stages with claws, or by an analogous element.

What we claim is:

1. A device for joining the two stages of a self-propelled engine, such as a rocket or flare, which comprises a front stage, a rear accelerating stage, means for achieving the separation of the two stages after the combustion of the pyrotechnic charge of the rear stage is completed, means for carrying out the ignition of the pyrotechnic charge of the front stage, wherein a rear part of the front stage and a front part of the rear stage are assembled together for sliding axial movement therebetween, a temporary fragile connection under the effect of the ignition of the rear stage maintains a predetermined spacing between said rear part of the front stage and said front part of the rear stage, the rear part of the front stage includes means for igniting, after a predetermined delay, a pyrotechnic charge of the front stage, the front part of the rear stage includes mean for triggering the igniting means by contact therewith upon said spacing becoming closed when said temporary connection is eliminated and the connection between the front stage and the rear stage comprises means for holding the front and rear stages against relative rotation and wherein the maximum cross-section of the rear stage is greater than the maximum cross-section of the front stage.

2. A self-propelled engine according to claim 1, wherein the means for holding the front and rear stages against relative rotation comprises a pin firmly fixed to the front part of the rear stage or to the rear part of the front stage and inserted in a bore in the other of said parts.

3. A self-propelled engine according to claim 1, wherein the means for igniting the front stage pyrotechnic charge comprises a detonator and a pyrotechnic transmission fuse, the detonator and fuse being connected together and positioned along the axis of a nozzle of the front stage.

4. A self-propelled engine according to claim 1 or claim 3, wherein the means for triggering the igniting means comprises a striking pin which is arranged to contact the igniting means when the temporary connection is eliminated and when the front part of the rear stage has moved towards the rear part of the front stage to close the said predetermined space.

5. A self-propelled engine according to claim 4, wherein the striking pin is fixed onto the front part of the rear stage.

* * * * *